US008358659B2

(12) United States Patent
Lingafelt et al.

(10) Patent No.: US 8,358,659 B2
(45) Date of Patent: Jan. 22, 2013

(54) VISUAL METERING AND RESPONSE TO MAINTAIN VOICE QUALITY IN A VOICE OVER INTERNET PROTOCOL CALL

(75) Inventors: Charles Steven Lingafelt, Durham, NC (US); Martinianus BudiTjahja Hadinata, Brunnen (CH); John Elbert Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 11/968,419

(22) Filed: Jan. 2, 2008

(65) Prior Publication Data

US 2009/0168661 A1 Jul. 2, 2009

(51) Int. Cl.
*H04L 12/00* (2006.01)
*G06F 13/26* (2006.01)
(52) U.S. Cl. .................... 370/395.42; 709/207
(58) Field of Classification Search .................. None
See application file for complete search history.

(56) References Cited

U.S. PATENT DOCUMENTS

| | | | |
|---|---|---|---|
| 7,072,942 B1 * | 7/2006 | Maller | 709/206 |
| 7,085,230 B2 * | 8/2006 | Hardy | 370/232 |
| 7,167,451 B1 * | 1/2007 | Oran | 370/252 |
| 7,448,049 B1 * | 11/2008 | Xing | 719/318 |
| 7,836,430 B2 * | 11/2010 | Shebs | 717/124 |
| 7,929,553 B2 * | 4/2011 | Diab | 370/401 |
| 2002/0075803 A1 * | 6/2002 | Zaharychuk et al. | 370/231 |
| 2004/0170163 A1 * | 9/2004 | Yik et al. | 370/389 |
| 2004/0186904 A1 | 9/2004 | Oliveira | |
| 2004/0208133 A1 * | 10/2004 | Jay et al. | 370/252 |
| 2004/0213390 A1 | 10/2004 | Lazarus et al. | |
| 2005/0289362 A1 * | 12/2005 | Merkin et al. | 713/300 |
| 2007/0133515 A1 * | 6/2007 | Kumar et al. | 370/352 |
| 2008/0062887 A1 * | 3/2008 | Parolkar et al. | 370/252 |
| 2011/0265089 A1 * | 10/2011 | Ostojic | 718/103 |

FOREIGN PATENT DOCUMENTS

WO    WO 2008068505 A1 *   6/2008

* cited by examiner

*Primary Examiner* — Kibrom T Hailu
*Assistant Examiner* — Benjamin Lamont
(74) *Attorney, Agent, or Firm* — Yee & Associates, P.C.; Arthur J. Samodovitz

(57) ABSTRACT

A computer implemented method, apparatus, and computer usable program product for managing a voice over Internet Protocol call. A selected set of resources associated with a quality of the voice over Internet Protocol call in a data processing system is monitored during the voice over Internet Protocol call. A determination is made as to whether the quality of the voice over Internet Protocol call in a data processing has fallen below a desired level. A corrective action is performed with respect to the selected set of resources in response to the quality of the voice over Internet Protocol call falling below the desired level.

12 Claims, 7 Drawing Sheets

| | RESOURCE | THRESHOLD LEVEL | CORRECTIVE ACTIONS |
|---|---|---|---|
| 508 | PROCESSOR | 75% | LOWER THE PROCESSOR PRIORITY OF OFFICE TYPE APPLICATIONS |
| 510 | PROCESSOR | 80% | PAUSE ANY COMPRESSION JOBS LIKE BACKUP |
| 512 | PROCESSOR | 75% | LOWER THE PROCESSOR PRIORITY OF WEB BROWSERS |
| 514 | PROCESSOR | 75% | LOWER PROCESSOR PRIORITY OF EMAIL TYPE APPLICATIONS |
| 516 | PROCESSOR | 75% | LOWER THE PROCESSOR PRIORITY OF EMAIL AND INSTANT MESSAGE CLIENTS |
| 518 | MEMORY | 75% | WRITE TO SWAP FILE MORE OF THE PROGRAM AND APPLICATION DATA FOR WEB BROWSERS |
| 520 | MEMORY | 75% | WRITE TO SWAP FILE MORE OF THE PROGRAM AND APPLICATION DATA FOR INSTANT MESSAGING CLIENTS |
| 522 | NETWORK INTERFACE UTILIZATION UP-LINK | 66% | ENABLE QoS (QUALITY OF SERVICE) FOR THE VoIP CLIENT |
| 524 | NETWORK INTERFACE UTILIZATION UP-LINK | 66% | STOP ALL LARGE FILE TRANSFERS |
| 526 | NETWORK INTERFACE UTILIZATION UP-LINK | 66% | STOP EMAIL REPLICATIONS |

500 / 502 504 506

| | RESOURCE | THRESHOLD LEVEL | CORRECTIVE ACTIONS |
|---|---|---|---|
| 508 | PROCESSOR | 75% | LOWER THE PROCESSOR PRIORITY OF OFFICE TYPE APPLICATIONS |
| 510 | PROCESSOR | 80% | PAUSE ANY COMPRESSION JOBS LIKE BACKUP |
| 512 | PROCESSOR | 75% | LOWER THE PROCESSOR PRIORITY OF WEB BROWSERS |
| 514 | PROCESSOR | 75% | LOWER PROCESSOR PRIORITY OF EMAIL TYPE APPLICATIONS |
| 516 | PROCESSOR | 75% | LOWER THE PROCESSOR PRIORITY OF EMAIL AND INSTANT MESSAGE CLIENTS |
| 518 | MEMORY | 75% | WRITE TO SWAP FILE MORE OF THE PROGRAM AND APPLICATION DATA FOR WEB BROWSERS |
| 520 | MEMORY | 75% | WRITE TO SWAP FILE MORE OF THE PROGRAM AND APPLICATION DATA FOR INSTANT MESSAGING CLIENTS |
| 522 | NETWORK INTERFACE UTILIZATION UP-LINK | 66% | ENABLE QoS (QUALITY OF SERVICE) FOR THE VoIP CLIENT |
| 524 | NETWORK INTERFACE UTILIZATION UP-LINK | 66% | STOP ALL LARGE FILE TRANSFERS |
| 526 | NETWORK INTERFACE UTILIZATION UP-LINK | 66% | STOP EMAIL REPLICATIONS |

*FIG. 5*

VISUAL METERING AND RESPONSE TO MAINTAIN VOICE QUALITY IN A VOICE OVER INTERNET PROTOCOL CALL

BACKGROUND OF THE INVENTION

1. Field of the Invention

The present invention relates generally to an improved data processing system and in particular to a method and apparatus for processing voice data. Still more particularly, the present invention relates to a computer implemented method, apparatus, and computer program product for monitoring and maintaining voice quality for a voice over Internet Protocol call.

2. Description of the Related Art

Softphones employing voice over Internet Protocol connections are becoming more and more common. Unlike landline connections, a softphone may relay on various elements to ensure a quality of service level.

Voice over Internet Protocol (VoIP) technology uses package switching capabilities on networks, such as the Internet, to provide phone service. Voice over Internet Protocol has a number of advantages over a traditional circuit switching telephone network. For example, packet switching allows several calls to occupy the same amount of space occupied by a single call in a circuit switch network, such as a public switched telephone network (PSTN).

Voice over Internet Protocol systems may provide different levels of service. Factors such as latency, jitter, and packet loss may affect the quality of a particular call. These and other factors may cause calls to become distorted, garbled, or lost because of transmission errors. Current systems focus on dynamically altering characteristics of the network over which voice over Internet Protocol calls are conducted. These changes include, for example, dynamically altering packet transmission attributes, reserving bandwidth in the network, changing the packet size, and changing the encoder/decoder quality to change the amount of information transmitted from a sender to a receiver.

Therefore, it would be advantageous to have a method, apparatus, and computer program product to overcome the problems described above, as well as other problems.

SUMMARY OF THE INVENTION

The illustrative embodiments provide a computer implemented method, apparatus, and computer usable program product for managing a voice over Internet Protocol call. A selected set of resources associated with a quality of the voice over Internet Protocol call in a data processing system is monitored during the voice over Internet Protocol call. A determination is made as to whether the quality of the voice over Internet Protocol call in a data processing has fallen below a desired level. A corrective action is performed with respect to the selected set of resources in response to the quality of the voice over Internet Protocol call falling below the desired level.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram illustrating a quality of service policy in accordance with an illustrative embodiment;

DETAILED DESCRIPTION OF THE PREFERRED EMBODIMENT

Figure 1:
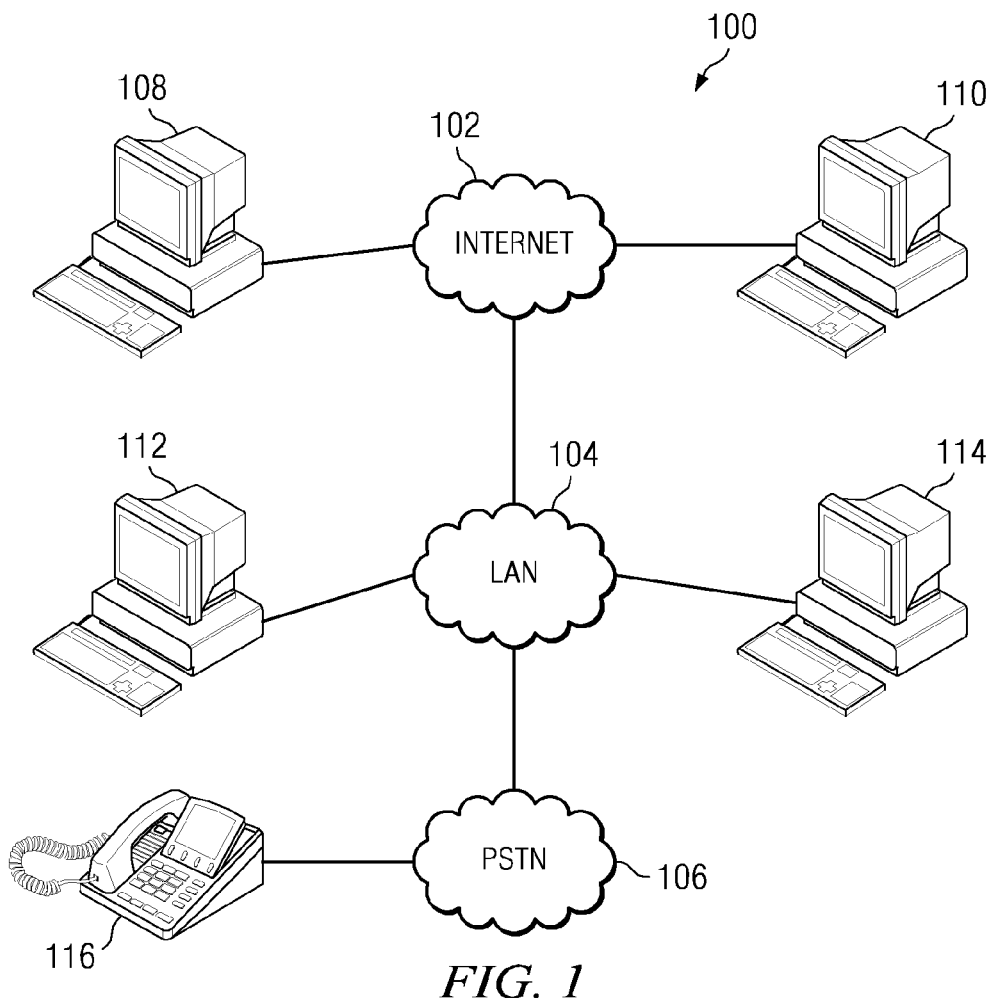
FIG. 1 is a pictorial representation of a network of data processing systems in which different illustrative embodiments may be implemented.
Figure 2:
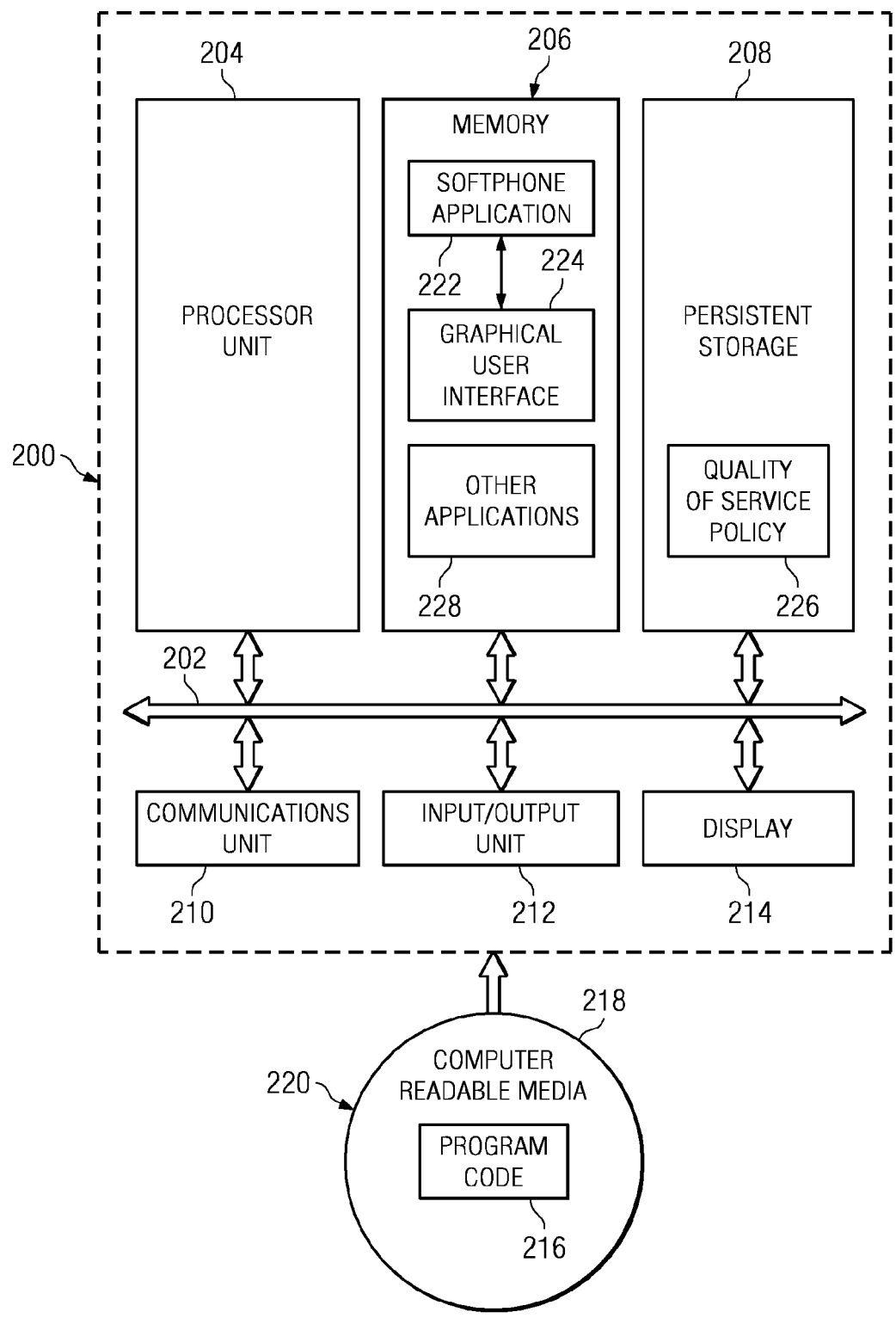
FIG. 2 is a diagram of a data processing system in accordance with an illustrative embodiment.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted embodiments may be made.

FIG. 1 is a pictorial representation of a network of data processing systems in which different illustrative embodiments may be implemented. In this example, network data processing system 100 includes Internet 102 and local area network (LAN) 104. Additionally, network data processing system 100 also includes public switched telephone network (PSTN) 106. These different networks are the medium used to provide communications links between various devices and computers connected together within network data processing system 100. Internet 102 and local area network 104 may include connections, such as wire lines, wireless communications links, or fiber optic cables. Public switched telephone network 106 includes wired connections, in these examples.

As illustrated, computers 108 and 110 connect to Internet 102, and computers 112 and 114 connect to local area network 104. Telephone 116 connects to public switched telephone network 106, in this example. Network data processing system 100 may include additional computers and other devices not shown. Additionally, network data processing system 100 also may include other types of networks, such as, for example, an intranet, or a wide area network (WAN). FIG. 1 is intended as an example and not as an architectural limitation for the different illustrative embodiments.

In these different illustrative examples, users or operators of computers 108, 110, 112, and 114, and telephone 110 may make calls with each other. Computers 108, 110, 112, and 114, in these examples, include software applications to establish these calls using voice over Internet Protocol technology.

These types of applications are also referred to as softphone applications or voice suites. Different illustrative embodiments may be implemented within the software executing on computers 108, 110, 112, and 114 to visually monitor the quality of voice calls and to respond to changes in the quality of the voice calls.

Turning now to FIG. 2, a diagram of a data processing system is depicted in accordance with an illustrative embodiment. In this illustrative example, data processing system 200 includes communications fabric 202, which provides communications between processor unit 204, memory 206, persistent storage 208, communications unit 210, input/output unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different illustrative embodiments recognize that current systems for maintaining quality of service for voice over Internet Protocol calls have focused on the modification and alternation of network characteristics to improve or maintain a user perceived quality for a call. The different illustrative embodiments recognize that the different presently available systems and techniques do not provide any focus on altering the characteristics of a data processing system on which a voice Internet Protocol call is made.

In these examples, program code for different processes in the illustrative embodiments may be found in memory 206 and persistent storage 208. For example, softphone application 222 may be loaded from persistent storage 208 into memory 206 for execution by processor unit 204. Further, graphical user interface 224 may be program code for softphone application 222 to provide a user interface for display to an operator of data processing system 200. Persistent storage 208 contains quality of service policy 226, which may be used to identify when selected resources within data processing system 200 have exceeded some threshold and require an action to maintain a quality of service for a call.

In addition to executing softphone application 222 and graphical user interface 224, processor unit 204 also may execute other applications 228, in these examples. These other applications may include, for example, backup processes, web browsers, email applications, instant message clients, and word processing programs. Thus, the different illustrative embodiments provide a visual indicator to help a user easily identify voice quality and automate processes to make changes when a desired quality for a voice call is absent.

In these examples, softphone application 222 monitors a set of resources associated with the quality of the voice over Internet Protocol in data processing system 200 during the voice over Internet Protocol call. Softphone application 222 determines whether the quality of the voice over Internet Protocol call in data processing system 200 has fallen below some desired level.

Also, softphone application 222 may provide a visual indication of the quality of the call and resource usage through graphical user interface 224, in these examples. A corrective action may be performed with respect to the selected set of resources in response to the quality of the voice over Internet Protocol call falling below the desired level.

Figure 3:
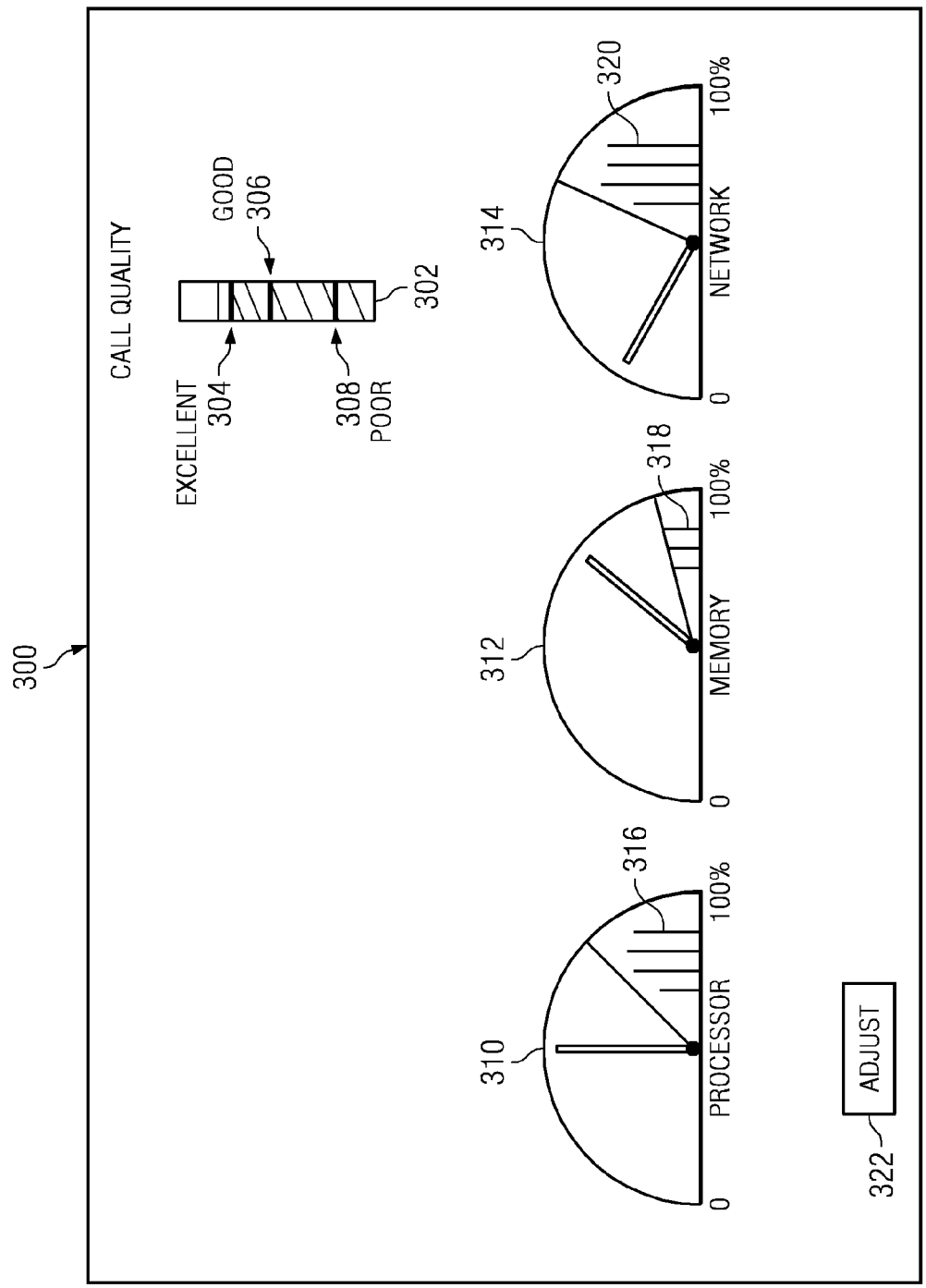
FIG. 3 is a diagram illustrating a graphical user interface for providing a visual indicator of voice quality for a voice over Internet Protocol call in accordance with an illustrative embodiment.

Turning now to FIG. 3, a diagram illustrating a graphical user interface for providing a visual indicator of voice quality for a voice over Internet Protocol call is depicted in accordance with an illustrative embodiment. In this example, window 300 is an example of a graphical user interface, such as graphical user interface 224 in FIG. 2.

In this example, window 300 provides a user an ability to identify voice quality and monitor resource usage. Call indicator bar 302 provides a user an ability to identify call quality in a visual manner without having to rely on the other party letting the user know that the user's voice is breaking up during a call. In this example, call indicator bar 302 includes three markers, excellent 304, good 306, and poor 308. In this example, the call quality is excellent 304.

The visual representation of the call quality may be derived from one or more measurable attributes of the call, such as the number and/or proportion of data packets lost, the amount or changing proportion of jitter (a measure of the inter-arrival time of the packets), and/or the number of bit or packet corruption errors detected. For example, more concern is present with the distribution of loss if 90 percent of the loss with within a short period of time as compared to a more even distribution over a longer period of time.

In addition to providing a visual indication of call quality, window 300 also may provide an identification resource usage for a set of selected resources. A set of selected resources is one or more selected resources. In this example, meters 310, 312, and 314 provide a visual indication of resource usage for a selected set of resources within a data processing system. In this example, meter 310 identifies a percent of processor usage, meter 312 identifies a percent of memory usage, and meter 314 identifies a percent of network usage. Examples of network usage include, for example, the proportion of voice over Internet Protocol packets compared with the total packages, the absolution quantity of voice over Internet Protocol data transmitted over the network interface compared with the maximum that could be transmitted of the network interface, the proportion of the capacity consumed that is dedicated to voice over Internet Protocol traffic through such techniques as VLANs, RSVP protocols, and proportion of voice over Internet Protocol to the total available bandwidth of the network/modem adapter. Section 316 in meter 310 is used to indicate when processor usage has reached an amount that affects the quality of the call.

Section 318 identifies when memory usage has reached a level that affects the quality of the call. In this example, section 320 identifies a level of network usage that affects the quality of the call.

A user may select adjust button 322 to initiate processes to increase the quality of the call. The user may select this control in response to an indication that the call quality has reached poor 308. The user also may initiate processes to increase the quality of the call even if the quality is not at the poor level. For example, if the quality of the call is between poor 308 and good 306, the user may still initiate the processes in an effort to increase the call quality.

In addition to call indicator bar 302 showing the quality level of the call, an additional alert may be presented if the call quality falls below a selected threshold, such as good 306 or poor 308. This additional alert may be an audio or visual alert, depending on the particular implementation. Call indicator bar 302 may flash if the call quality falls below a selected threshold. The selected threshold is used to identify when the quality of a call falls below a desired level.

In the different illustrative examples, this desired level may be above what a caller would perceive or notice as being poor. In this manner, a corrective action may be initiated before the call quality drops below a desired level to maintain the call quality of the call. In other examples, the desired level of the call may be at the level when the call perceives problems with the call quality, such as noise or dropped portions during the call. Another alert may include, for example, displaying another graphical indicator to indicate a call quality problem.

In other illustrative embodiments, the adjustment of call quality may be performed automatically if the call quality falls below some selected threshold. A user preference may be entered by a user to manually adjust call quality or automatically initiate processes to adjust call quality, in these examples.

The illustration of window 300 is presented for purposes of depicting one manner in which visual metering of resource usage and call quality may be implemented. In other embodiments, additional sets of resources may be monitored other than processor, memory, and network usage. Different aspects of resources may be monitored. As an example, network usage may be monitored using parameters or metrics such as, for example, upload speed and percent of packet loss.

Further, other graphical indicators may be used in addition to or in place of meters for presenting resource usage. For example, an indicator bar similar to call indicator bar 302 may be used to identify the usage of different resources.

In other embodiments, a number may be used or a graphical indicator that is displayed in different colors may be used to identify resource usage. In a similar fashion, the quality of the call may be presented using other types of graphical indicators other than call indicator bar 302. Further, the presentation of the actual call quality may be based on other levels other than excellent 304, good 306, and poor 308. For example, an identification of the call as being acceptable or unacceptable also may be presented in other implementations.

Figure 4:
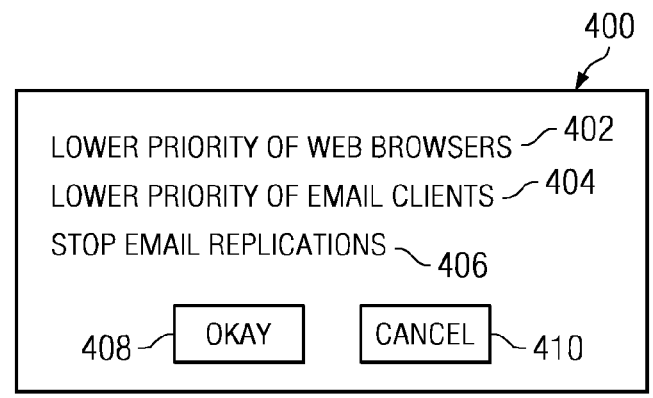
FIG. 4 is a diagram of a window for adjusting call quality in accordance with an illustrative embodiment.

With reference now to FIG. 4, a diagram of a window for adjusting call quality is depicted in accordance with an illustrative embodiment. In this example, window 400 is an example of a graphical user interface that may be part of graphical user interface 224 in FIG. 2. In this example, window 400 presents corrective actions 402, 404, and 406. In this illustrative example, corrective action 402 allows a user to lower the priority of web browsers, while corrective action 404 allows a user to lower the priority of email clients. Corrective action 406 allows a user to stop email replications.

A user may select one of these corrective actions and then select okay button 408 to initiate the corrective action. Depending on the particular implementation, a user may select more than one of corrective actions 402, 404, and 406. If the user does not wish to perform a corrective action, the user may select cancel button 410, in these examples.

The different graphical user interfaces presented in FIGS. 3 and 4 are depicted for purposes of illustration and are not meant to limit the manner in which different graphical user interfaces may be implemented to monitor resource usage and indicate call quality.

With reference now to FIG. 5, a diagram illustrating a quality of service policy is depicted in accordance with an illustrative embodiment. In this example, table 500 is an example of one implementation of quality of service policy 226 in FIG. 2. As illustrated, table 500 includes resource column 502, threshold level column 504, and corrective actions column 506. Resource column 502 identifies a particular resource and/or metric that may affect call quality. Threshold level column 504 identifies the percent or level of usage at or over which affects the call quality. Corrective actions column 506 identifies corrective actions that may be performed to lower the usage of a particular resource.

For example, entry 508 identifies the resource as being a processor. The threshold level at which the call quality may be considered below a desired level is 75 percent of processor capacity. One action to resolve or lower the usage of the processor is to lower the processor's compute resource priority for office type applications, resulting in less processor cycles devoted to office type application processing and more processor cycles devoted to call processing. Entry 510 also is for a processor as the resource. In this example, the threshold level over which call quality may degrade is 80 percent.

Different percentages may be present for different entries. The percentages also may be different for different for the same types of entries for different applications or data processing systems. Different applications may have different effects on a data processing system at the same processor utilization because of many factors. The factors include, for example, their cache foot print, and their degree of resource locking. Each vendor of an application may provide in a standard method, the threshold value (based on their own testing or individual attributes of the application) as part of the installation of the application and this rules table would be dynamically built.

The corrective action in this entry is to pause any compression jobs that may be active. Entries 512, 514, and 516 also relate to processors and all have threshold levels of 75 percent. Entry 512 may resolve the usage of processor resources that affect call quality by lowering the priority of web browsers. Entry 514 lowers the priority of email type applications as a corrective action to resolve processor usage. In entry 516, the priority of email and instance message clients are lowered to attempt to resolve processor usage affecting call quality.

Entries 518 and 520 relate to memory usage within a data processing system. In each of these entries, a corrective action may be performed if a threshold level of 75 percent of physical memory usage occurs or is exceeded. In entry 518, the corrective action to reduce usage of memory may be to write to the swap file more of the program and application data for web browsers. In entry 520, the corrective action may be to write to the swap file more of program application data for instant messaging clients.

Next, entries 522, 524, and 526 are directed towards a network interface utilization uplink. In these examples, the threshold level is 66 percent of uplink capacity. Entry 522 includes a corrective action of enabling a quality of service for the voice over Internet Protocol client. Entry 524 stops all large file transfers if the threshold is met or exceeded. Entry 526 stops email replications.

Figure 6:
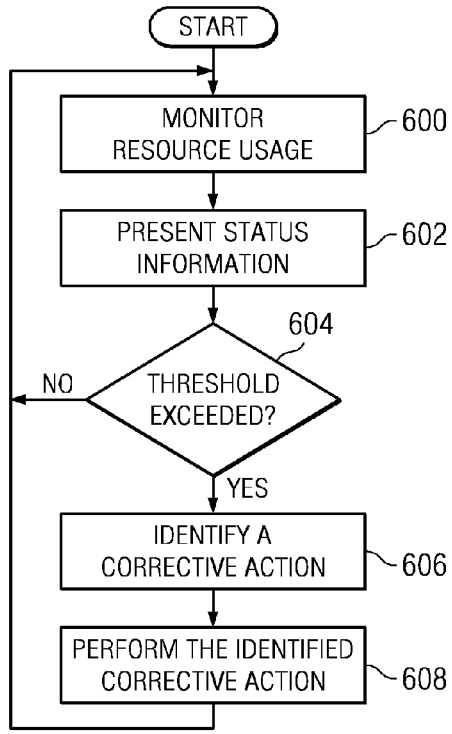
FIG. 6 is a high level flowchart of a process for managing call quality in accordance with an illustrative embodiment.

Turning now to FIG. 6, a high level flowchart of a process for managing call quality is depicted in accordance with an illustrative embodiment. The process begins by monitoring resource usage (step 600). The monitoring performed in step 600 may be executed using various known processes for monitoring resource usage in a data processing system. The monitoring may be preformed in a number of ways. For example, calls may be made to the operating system through dynamic link libraries or application programming interface (API) calls. Device drivers or other software components may be used that access this information through the operating system or in a manner independent of the operating system.

Status information is presented using the monitored resource usage (step 602). In these examples, this status information may be presented through a graphical user interface, such as window 300 in FIG. 3. Thereafter, a determination is made as to whether the threshold has been exceeded (step 604). This threshold may be, for example, resource usage or the call quality. If a threshold for resource usage has been exceeded, a corrective action is identified (step 606). In step 606, the corrective action may be identified automatically or through user input, in these examples.

The process then performs the identified corrective action (step 608), with the process then returning to step 600 as described above. The process also returns to step 600 from step 604 if a threshold for resource usage has not been exceeded. In these examples, the corrective action may be selected using a quality of service policy, such as the one illustrated in table 500 in FIG. 5.

Figure 7:
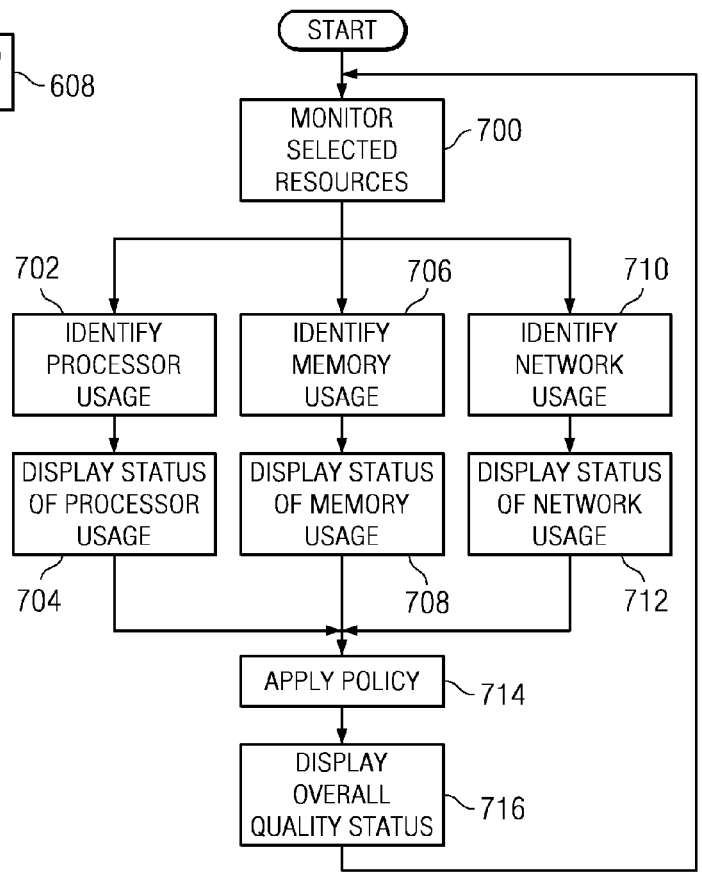
FIG. 7 is a flowchart of a process for monitoring resource usage in accordance with an illustrative embodiment.

With reference now to FIG. 7, a flowchart of a process for monitoring resource usage is depicted in accordance with an illustrative embodiment. The process in FIG. 7 may be implemented in a software component, such as softphone application 222 in FIG. 2.

The process begins by monitoring a set of selected resources (step 700). A set of selected resources is one or more resources, in these examples. The illustrative example monitors processor usage, memory usage, and network usage. Of course, other resources may be monitored in addition to or in place of these depicted resources. For example, other resources include, for example, without limitation, upload speed and percent of packet loss.

After monitoring the selected resources, processor usage is identifies (step 702) and the status of this processor usage is displayed (step 704). Additionally, the process from step 700 identifies memory usage (step 706) and displays the status of memory usage (step 708). The process also identifies network usage (step 710) and displays the status of network usage (step 712) from step 700. These different identifying displaying steps are performed in parallel, in these examples.

Displaying the status of processor usage, memory usage, and network usage in steps 704, 708, and 712 may be performed using a window, such as window 300 in FIG. 3. The status of usage of different resources may be displayed using meters, such as meters 310, 312, and 314 in FIG. 3.

Thereafter, the process applies a policy to the identified usages for the different selected resources (step 714). This policy is applied to generate an identification of the quality of the call. The process then displays the overall quality status for the call (step 716), with the process then returning to step 700 as described above. The display of the overall quality status in step 716 may be performed using window 300 in FIG. 3. In particular, call indicator bar 302 in FIG. 3 may be used to present the overall call quality status.

Figure 8:
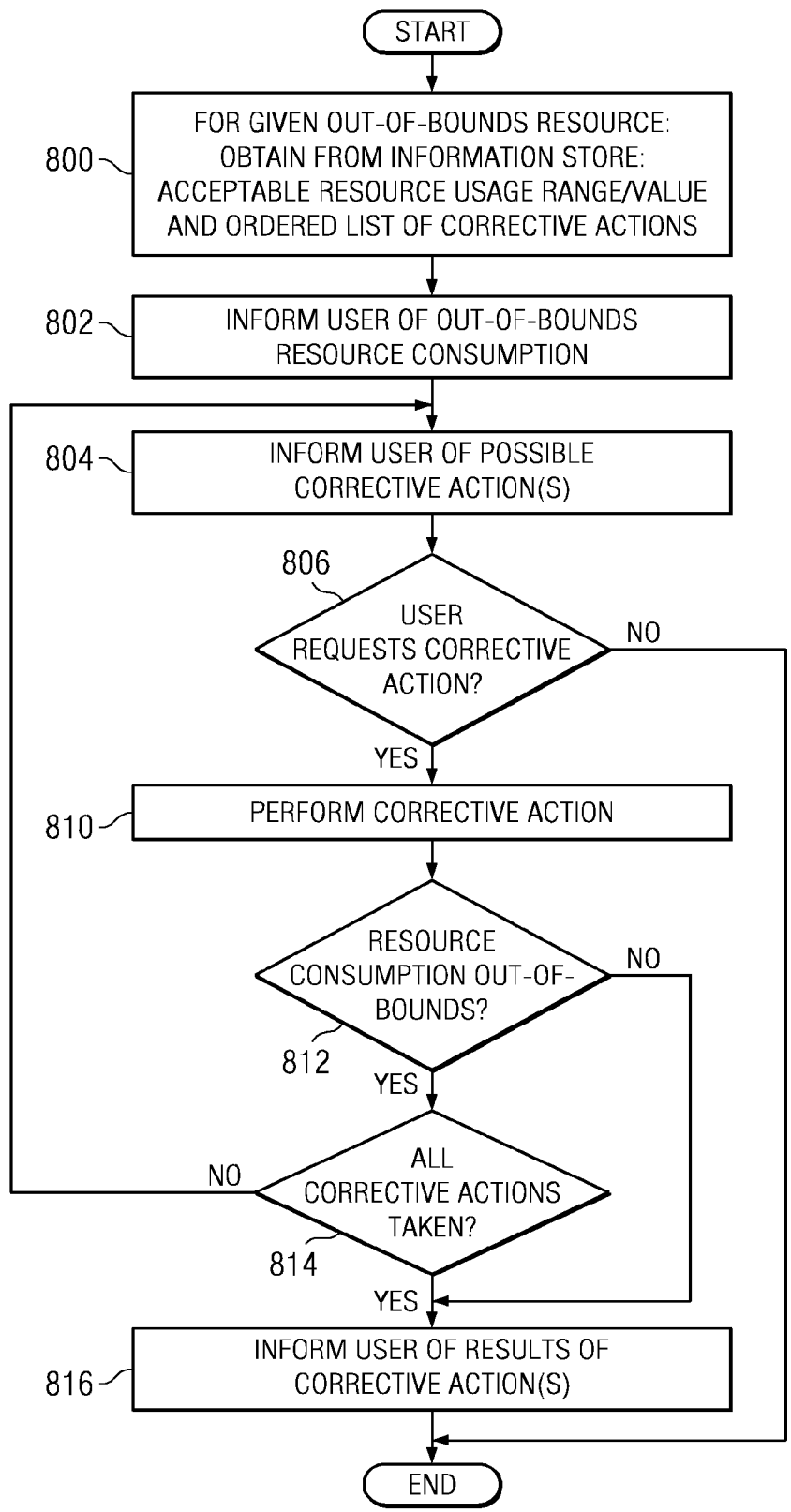
FIG. 8 is a flowchart of a process for a user controlled corrective action in accordance with an illustrative embodiment.

Turning now to FIG. 8, a flowchart of a process for a user controlled corrective action is depicted in accordance with an illustrative embodiment. The process illustrated in FIG. 8 may be implemented in a software component, such as softphone application 222 in FIG. 2.

The process begins by obtaining an acceptable resource usage range and value in an ordered list of corrective actions for a given out-of-bounds resource (step 800). In these examples, a resource is an out-of-bounds resource if the resource usage of the resource is equal to or greater than a threshold value. In these examples, a resource is considered to be out-of-bounds when a threshold value is either exceeded or met. Thereafter, the process informs the user of the out-of-bounds resource consumption (step 802). Step 802 may be performed by displaying this information in a graphical user interface, such as window 300 in FIG. 3. An alert may be generated in an indicator, such as call indicator bar 302 in FIG. 3, in these examples.

The user is informed of possible corrective action(s) (step 804). Step 804 may be implemented using a graphical user interface, such as window 400 in FIG. 4. A determination is then made as to whether the user requests a corrective action (step 806). If the user requests a corrective action, the process performs the corrective action (step 810).

Afterwards, a determination is made as to whether the resource consumption is still out-of-bounds after the corrective action (step 812). If the resource consumption is still out-of-bounds, a determination is made as to whether all of the corrective actions that are possible for the out-of-bounds resource have been taken (step 814).

If all of the corrective actions have not been taken, the process returns to step 804 to inform the user of possible corrective actions that still remain. If all of the corrective actions have been taken, the process informs the user of the results of the corrective action(s) (step 816). Step 816 may be performed by displaying information in window 300 in FIG. 3. The process terminates thereafter.

With reference again to step 812, if the resource consumption is not longer out-of-bounds, the process proceeds to step 816 as described above. With reference again to step 806, if the user does not request a corrective action, the process terminates.

Figure 9:
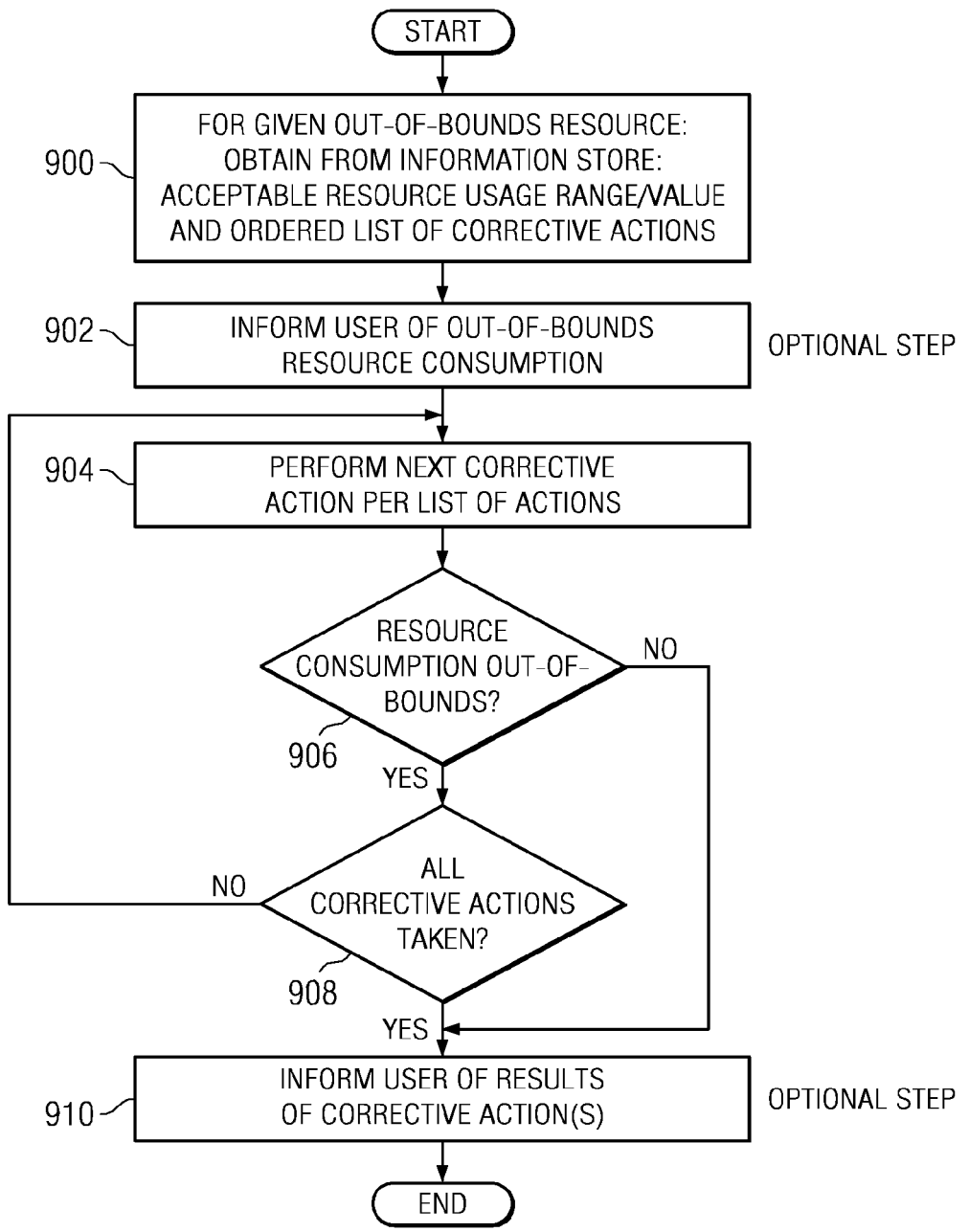
FIG. 9 is a flowchart of a process for a rules based corrective action in accordance with an illustrative embodiment.

Turning now to FIG. 9, a flowchart of a process for rule based corrective action is depicted in accordance with an illustrative embodiment. The process illustrated in FIG. 9 may be implemented in a software component, such as softphone application 222 in FIG. 2. The process in this illustrative example is performed automatically without requiring user input to initiate corrective actions.

The process begins by identifying an acceptable resource usage range/values in an ordered list of corrective actions for the out-of-bounds resource (step 900). Thereafter, the process informs the user of the out-of-bounds resource consumption (step 902). Step 902 is an optional step and may be implemented using a graphical user interface, such as window 300 in FIG. 3. For example, an alert may be generated using call indicator bar 302 in FIG. 3 through indicating a poor call quality. Additionally, an alert may be generated by causing call indicator bar 302 in FIG. 3 to flash to gain the users attention.

The process performs the next unperformed corrective action in the list of actions (step 904). Thereafter, a determination is made as to whether the resource consumption is still out-of-bounds (step 906). If the resource consumption is still out-of-bounds, a determination is made as to whether all of the corrective actions in the list have been taken (step 908). If all of the corrective actions have not been taken, the process returns to step 904.

With reference again to step 908, if all the corrective actions have been taken, the user is informed of the results of the corrected action(s) (step 910), with the process terminating thereafter. In these examples, step 910 is an optional step. The user may be informed of the results through information presented in a graphical user interface, such as window 300 in FIG. 3. With reference again to step 906, if the resource consumption is no longer out-of-bounds, the process also proceeds to step 910 as described above.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different illustrative embodiments provide a computer implemented method, apparatus, and computer program product for managing a voice over Internet Protocol call. In the different illustrative embodiments, a selected set of resources associated with a quality of the voice over Internet Protocol call in the data processing system is monitored during the voice over Internet Protocol call. A determination is made as to whether the quality of the voice over Internet Protocol call in the data processing system has fallen below a desired level. A corrective action is performed with respect to the selected set of resources in response to the quality of the voice over Internet Protocol call falling below the desired level.

With these and other features of the different illustrative embodiments, the call quality of a voice over Internet Protocol call may be monitored by a user through a graphical user interface. This provides the user an ability to identify when call quality has fallen below some desired level or threshold level. As a result, the call does not have to rely on the other party telling the caller that the call quality has degraded.

Further, the different illustrative embodiments also provide a feature that allows a user to maintain the quality of the call through managing resources located on the data processing system on which the softphone application is executing. Resource usage may be managed to reduce resource allocation or usage by other applications or devices to provide the application executing the voice over Internet Protocol call sufficient resources to maintain a quality service for the user.

Although the different illustrative embodiments are directed towards maintaining a quality for a voice over Internet Protocol call, the different illustrative embodiments may be applied to other types of critical functions, such as, for example, streaming audio, streaming video, and any real-time communication streams. Also, the different illustrative embodiments may be applied to any type of digital voice communication in which voice data is transmitted using packets over a network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk -read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing quality of a voice over Internet Protocol ("VOIP") call, the method comprising the steps of:
    a computer executing a first program with a CPU in the computer to process the VOIP call and transmit the processed VOIP call over a network, the first program having a first priority for execution by the CPU;
    the computer monitoring utilization of the CPU during the processing and/or transmission of the VOIP call;
    the computer determining whether the quality of the VOIP call is below a predetermined quality level, and if so, the computer automatically lowering priority of a second program for execution by the CPU in the computer such that the first program has a higher priority for execution by the CPU than the second program and additional utilization of the CPU is made available to process and/or transmit the VOIP call;
    the computer determining a lower priority of the second program as one of a predetermined set of corrective actions for the VOIP call being below a predetermined quality level based on a policy maintained within the computer; and
    the computer executing the second program according to the lower priority responsive to the determination of the lower priority of the second program based on the policy maintained within the computer.

2. The method of claim 1, further comprising:
    the computer determining, responsive to executing the second program according to the lower priority, whether the quality of the VOIP call remains below the predetermined quality level; and
    responsive to the determination that the quality of the VOIP call remains below the predetermined quality level, automatically increasing swap file utilization for an application program running on the computer such that additional utilization of computer memory is made available to process and/or transmit the VOIP call based on the policy maintained within the computer.

3. The method of claim 2, wherein the policy comprises a table having a plurality of entries, wherein for lower and lower quality levels of the VOIP call, more and more utilization of the CPU is made available for the processing or transmission of the VOIP call according to the plurality of entries.

4. A computer program product for managing quality of a voice over Internet Protocol ("VOIP") call, the computer program product comprising:
    a computer-readable tangible storage device;
    a first program, stored on the computer- readable tangible storage device, to provide VOIP call processing by a CPU in a computer and transmit the processed VOIP call over a network, the first program having a first priority for execution by the CPU;
    program code, stored on the computer-readable tangible storage device, to monitor utilization of the CPU during the processing and/or transmission of the VOIP call;
    program code, stored on the computer-readable tangible storage device, to determine whether the quality of the VOIP call is below a predetermined quality level, and if so, automatically lower priority of a second program for execution by the CPU in the computer such that the first program has a higher priority for execution by the CPU than the second program and additional utilization of the CPU is made available to process and/or transmit the VOIP call; and
    program code, stored on the computer-readable tangible storage device, to determine a lower priority of the second program as one of a predetermined set of corrective actions for the VOIP call being below a predetermined quality level based on a policy maintained within the computer.

5. The computer program product of claim 4, further comprising:
    program code, stored on the computer-readable tangible storage device, responsive to the program code to determine the lower priority of the second program, to determine whether the quality of the VOIP call remains below the predetermined level; and
    program code, stored on the computer-readable tangible storage device, responsive to the determination that the quality of the voice over Internet Protocol call remains below the predetermined quality level, to select a corrective action in the set of corrective actions based on the policy to automatically increase swap file utilization for an application program running on the computer such that additional utilization of computer memory is made available to process and/or transmit the VOIP call.

6. A data processing system comprising:
    a processor unit, a computer readable memory and a computer-readable tangible storage media;
    first program instructions to process a voice over Internet Protocol ("VOIP") call by the data processing system and transmit the processed VOIP call over a network;

second program instructions to determine whether quality of the VOIP call is below a predetermined quality level, and if so, automatically increase swap file utilization for an application program running on the data processing system such that additional utilization of the computer readable memory is made available to process and/or transmit the VOIP call; and wherein the first and second program instructions are stored on the computer-readable tangible storage media for execution by the processor unit via the computer readable memory.

7. The data processing system of claim 6, wherein the application program is one of a web browser and an instant messaging client.

8. The data processing system of claim 6, further comprising:
program instructions, responsive to the quality of the VOIP call remaining below the predetermined level after the automatically increase swap file utilization, to automatically perform one of: pausing a compression process within the data processing system, stopping in the data processing system a file transfer over a predetermined threshold size, and stopping email replication in the data processing system, and wherein the program instructions are stored on the computer-readable tangible storage media for execution by the processor unit via the computer readable memory.

9. The data processing system of claim 6 further comprising:
program instructions to select the second program instructions from a set of corrective actions based on a policy maintained within the data processing system, and wherein the program instructions are stored on the computer-readable tangible storage media for execution by the processor unit via the computer readable memory.

10. The data processing system of claim 9, wherein the policy comprises a table having a plurality of entries, wherein for lower and lower quality levels of the VOIP call, more and more memory is made available for the processing or transmission of the VOIP call according to the plurality of entries.

11. A data processing system comprising:
a processor unit, a computer readable memory and a computer-readable tangible storage media;
first program instructions to process a voice over Internet Protocol ("VOIP") call by a CPU in the data processing system and transmit the processed VOIP call over a network;
second program instructions to determine whether quality of the VOIP call is below a predetermined quality level, and if so, automatically stop electronic mail (email) replications to decrease usage of the network by the data processing system such that additional utilization of the network is made available to process and/or transmit the VOIP call; and wherein the first and second program instructions are stored on the computer-readable tangible storage media for execution by the processor unit via the computer readable memory; and
third program code, stored on the computer-readable tangible storage media for execution by the processor unit via the computer readable memory, to select the program code to automatically stop email replications from a set of corrective actions based on a policy maintained within the data processing system, wherein the policy comprises a table having a plurality of entries, wherein each entry of the table includes a resource, a threshold level, and a corrective action, and wherein an entry of the plurality of entries is set by an application program during installation of the application program on the computer.

12. The data processing system of claim 11 further comprising:
program code, stored on the computer-readable tangible storage media for execution by the processor unit via the computer readable memory and responsive to the quality of the VOIP call remaining below the predetermined level after automatically stopping email replications, to perform one of: pause a compression process within the data processing system, write program data for a web browser in the data processing system to a swap file in the data processing system, write program data for an instant messaging application in the data processing system to the swap file in the data processing system, and stop a file transfer over a predetermined threshold size in the data processing system.

* * * * *